(12) United States Patent
Rumreich

(10) Patent No.: US 8,421,786 B2
(45) Date of Patent: Apr. 16, 2013

(54) DISPLAY DEVICE AND METHOD FOR USING THE SAME

(75) Inventor: Mark F. Rumreich, Indianapolis, IN (US)

(73) Assignee: TTE Indianapolis, Indianapolis, IN (US)

( * ) Notice: Subject to any disclaimer, the term of this patent is extended or adjusted under 35 U.S.C. 154(b) by 0 days.

(21) Appl. No.: 13/037,128

(22) Filed: Feb. 28, 2011

(65) Prior Publication Data

US 2011/0148836 A1    Jun. 23, 2011

Related U.S. Application Data

(63) Continuation of application No. 11/898,445, filed on Sep. 12, 2007, now abandoned.

(51) Int. Cl.
*G06F 3/038* (2006.01)
*G09G 5/00* (2006.01)

(52) U.S. Cl.
USPC .................. 345/207; 345/102; 345/690

(58) Field of Classification Search .............. 345/207, 345/102, 156–178; 715/700; 250/200, 553
See application file for complete search history.

(56) References Cited

U.S. PATENT DOCUMENTS 5,828,351 A * 10/1998 Wu ............................... 345/11
6,762,741 B2 * 7/2004 Weindorf ..................... 345/102

* cited by examiner

*Primary Examiner* — Kevin M Nguyen
*Assistant Examiner* — Kenneth B Lee, Jr.
(74) *Attorney, Agent, or Firm* — Morgan, Lewis & Bockius LLP

(57) ABSTRACT

A display device includes an image display region displaying images, an automatic light sensor sensing ambient lighting conditions of a location of the display device, and a control system controlling an amount of light produced within the image display region by the displayed images based upon the sensed ambient lighting conditions, wherein the control system includes a single user interface displayed within the image display region and allows simultaneous enabling/disabling of the automatic light sensor and adjusting of image display characteristic values of the displayed images by a user.

14 Claims, 5 Drawing Sheets

DISPLAY DEVICE AND METHOD FOR USING THE SAME

RELATED APPLICATIONS

This invention is a continuation patent application of patent application Ser. No. 11/898,445, filed on Sep. 12, 2007, now abandoned which is hereby incorporated by reference in its entirety.

BACKGROUND OF THE INVENTION

1. Field of the Invention

The present invention relates to a display device and a method of using a display device. More specifically, the present invention relates to a display device having a light sensor for controlling image brightness and a method of controlling image brightness using a light sensor.

2. Discussion of the Related Art

In general, during the 1970's, display devices, i.e., televisions, used light sensors to automatically control the brightness of displayed images according to ambient light conditions. Specifically, in high ambient light conditions, such as bright sunlight or under intense indoor lighting conditions, the light sensors would set the image contrast to a maximum for increased viewability. Conversely, in low ambient light conditions, such as low indoor lighting conditions, the light sensors would reduce the image contrast for the best viewability.

During the 1980's, display device manufacturers realized that use of automatic light sensors caused the display images to have a reduced contrast, thereby giving consumers a false sense of reduced brightness when the consumer viewed the display device in a showroom, which usually had intermediate indoor lighting conditions. Accordingly, when the consumer was in the showroom comparing display devices having the automatic light sensors with display devices that did not have the automatic light sensors, the consumer would naturally be preferentially drawn to the display device not having automatic light sensors. The reason being that in the showroom, images displayed by the display devices having the automatic light sensors would appear faint, washed-out, and less vibrant than images displayed by the display devices without the automatic light sensors.

Presently, display devices now provide automatic light sensors that can be disabled/enabled by the customers. For specific showroom performance, display devices may be shipped with automatic light sensors turned OFF, but most customers are completely unaware that the automatic light sensors may be turned ON once the display device is set-up in the customer's home. Specifically, display device manufacturers routinely ship their display devices having the automatic light sensor disabled, i.e., turned OFF. However, during initial set-up of the display device in the customer's home, enabling of the automatic light sensor is not easily accomplished since the set-up menus and submenus that allow for the enablement/disablement of the automatic light sensor are not provided as one single user interface menu. Accordingly, the customer is not likely to enable the automatic light sensor in the home.

FIGS. 1 and 2 are schematic views of user programming screens of a display device according to the prior art. In FIG. 1, a user programming screen 10 includes various main selections 20 and various sub-main selections 30. Here, once a main selection 20 is selected, each of the individual sub-main selections 30 dedicated to the selected one of the main selection 20 is offered for changing. As shown in FIG. 1, if the user selects SET-UP, then the individual sub-main selections 30 are shown for changing, including the sub-main selection for LIGHT SENSOR. Moreover, as shown in FIG. 2, if the user selects VIDEO, the individual sub-main selections 30 are shown for changing, including the sub-main selection of CONTRAST.

As demonstrated in FIGS. 1 and 2, image adjustments of the display device must be performed using two different user programming screens. Here, the enabling/disabling of the automatic LIGHT SENSOR and the adjustment of image CONTRAST must be performed using different programming screens. Accordingly, the user is not very likely to associate the automatic LIGHT SENSOR with the image CONTRAST control and is unlikely to perform the optimum adjustments to the automatic LIGHT SENSOR and the image CONTRAST control due to the structure of the user programming screens. As a result, a display device is needed that provides a user with the ability to associate the automatic LIGHT SENSOR with the image CONTRAST control and conveniently optimize the display device for the home viewing environment.

SUMMARY OF THE INVENTION

Accordingly, the present invention is directed to a light sensor interface of a display device and a method of using a display device having a light sensor interface that substantially obviates one or more of the problems due to limitations and disadvantages of the related art.

An object of the present invention is to provide a display device that allows a user to control image display quality.

Another object of the present invention is to provide a method of operating a display device that allows a user to control image display quality.

Another object of the present invention is to provide a user interface for a light sensor of a display device that allows a user to control image display quality.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a display device includes an image display region displaying images, an automatic light sensor sensing ambient lighting conditions of a location of the display device, and a control system controlling an amount of light produced within the image display region by the displayed images based upon the sensed ambient lighting conditions, wherein the control system includes a single user interface displayed within the image display region and allows simultaneous enabling/disabling of the automatic light sensor and adjusting of image display characteristic values of the displayed images by a user.

In another aspect, a method of operating a display device includes measuring ambient lighting conditions of a location of the display device, and controlling an amount of light produced by displayed images within an image display region of the display device based upon the measuring of the ambient lighting conditions, wherein the controlling of produced light includes a control system having a single user interface displayed within the image display region to simultaneously enable/disable the automatic light sensor and adjust image display characteristic values of the displayed images.

In another aspect, a programmable user interface system for a display device includes a user programming screen provided within an image display region of the display device, wherein the user programming screen provides simultaneous enablement/disablement of an automatic light sensor and adjustment of image display characteristic values of broadcast images within the image display region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, examples of which are illustrated in the accompanying drawings.

Figure 1:
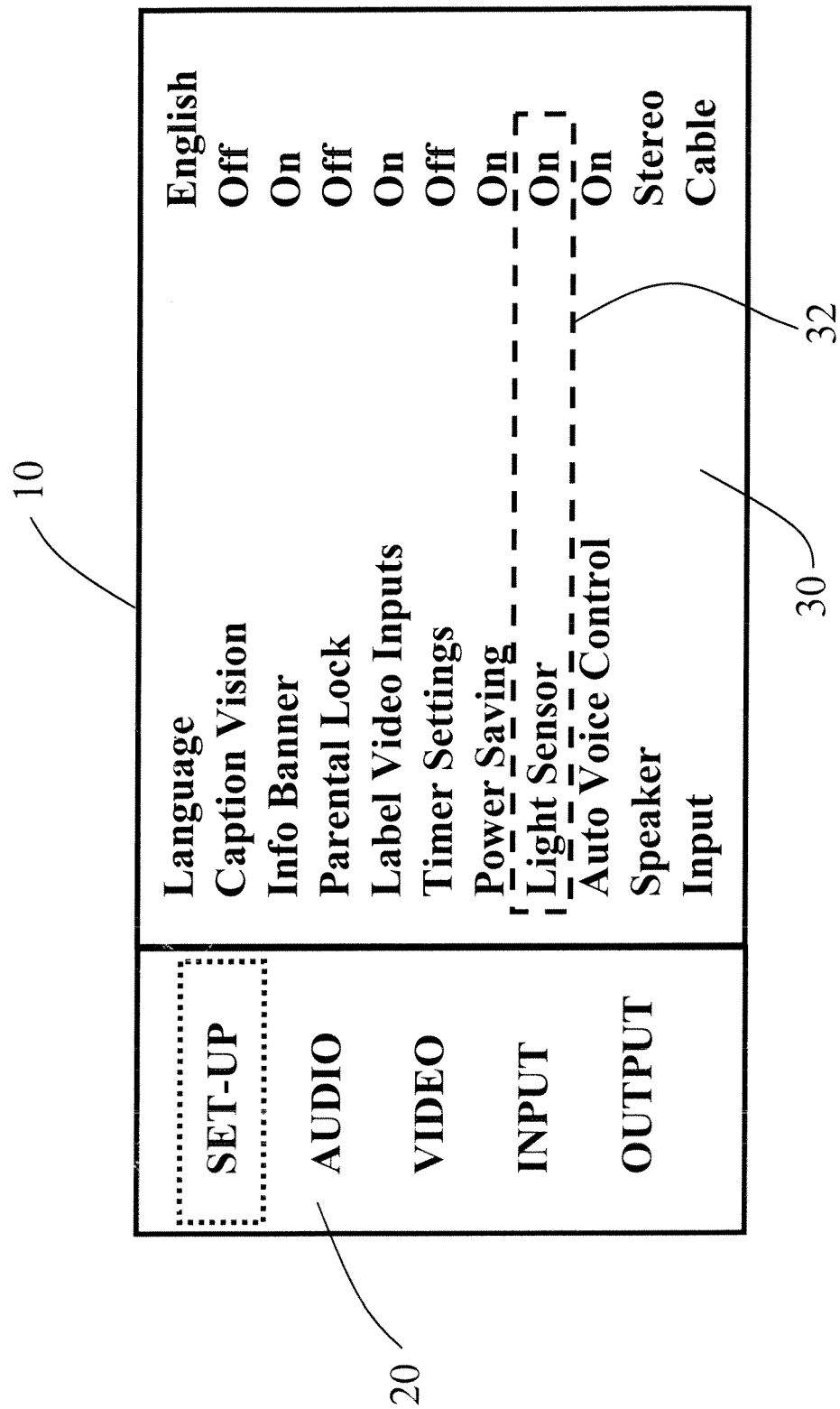
FIGS. 1 and 2 are schematic views of user programming screens of a display device according to the prior art.
Figure 2:
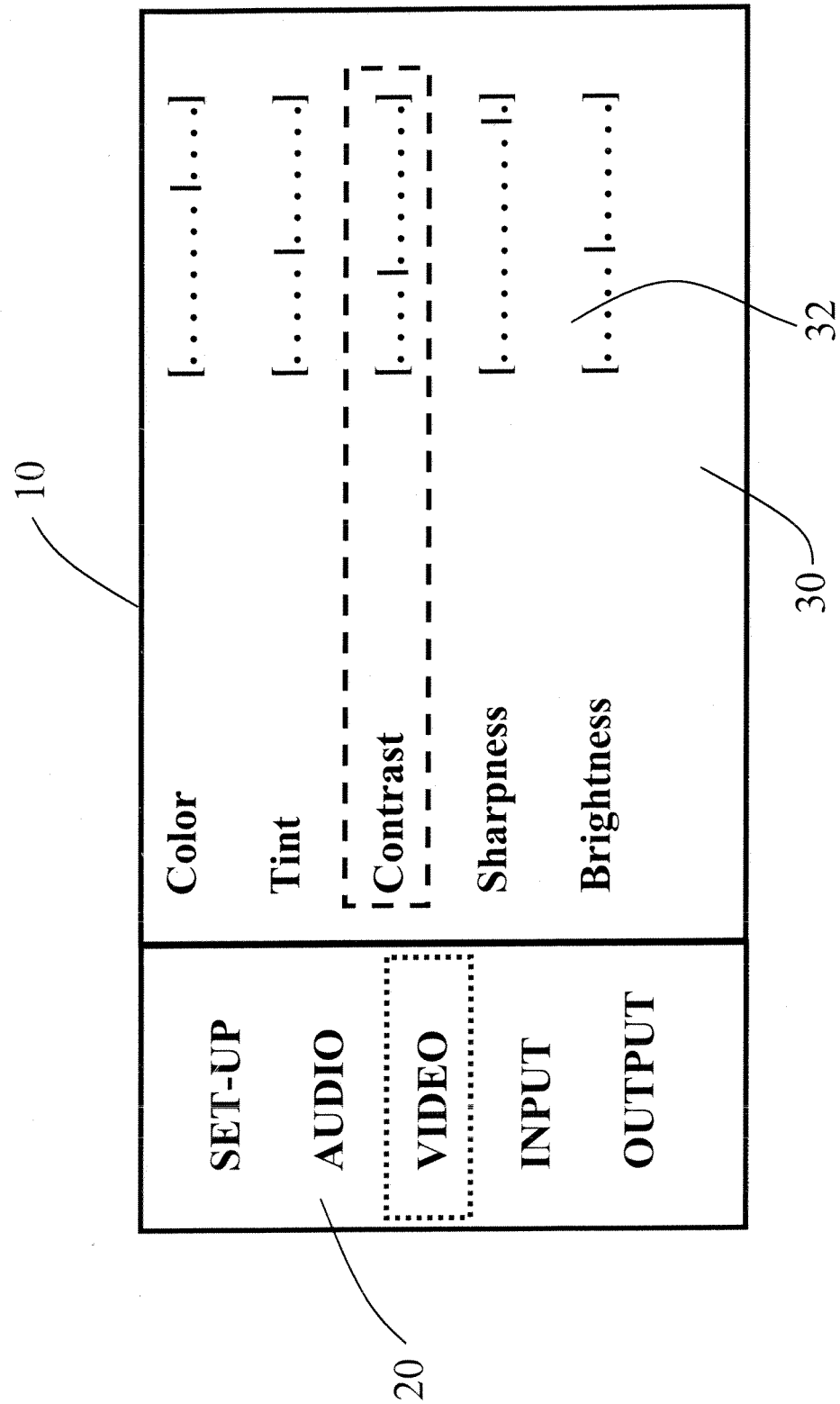
Figure 3:
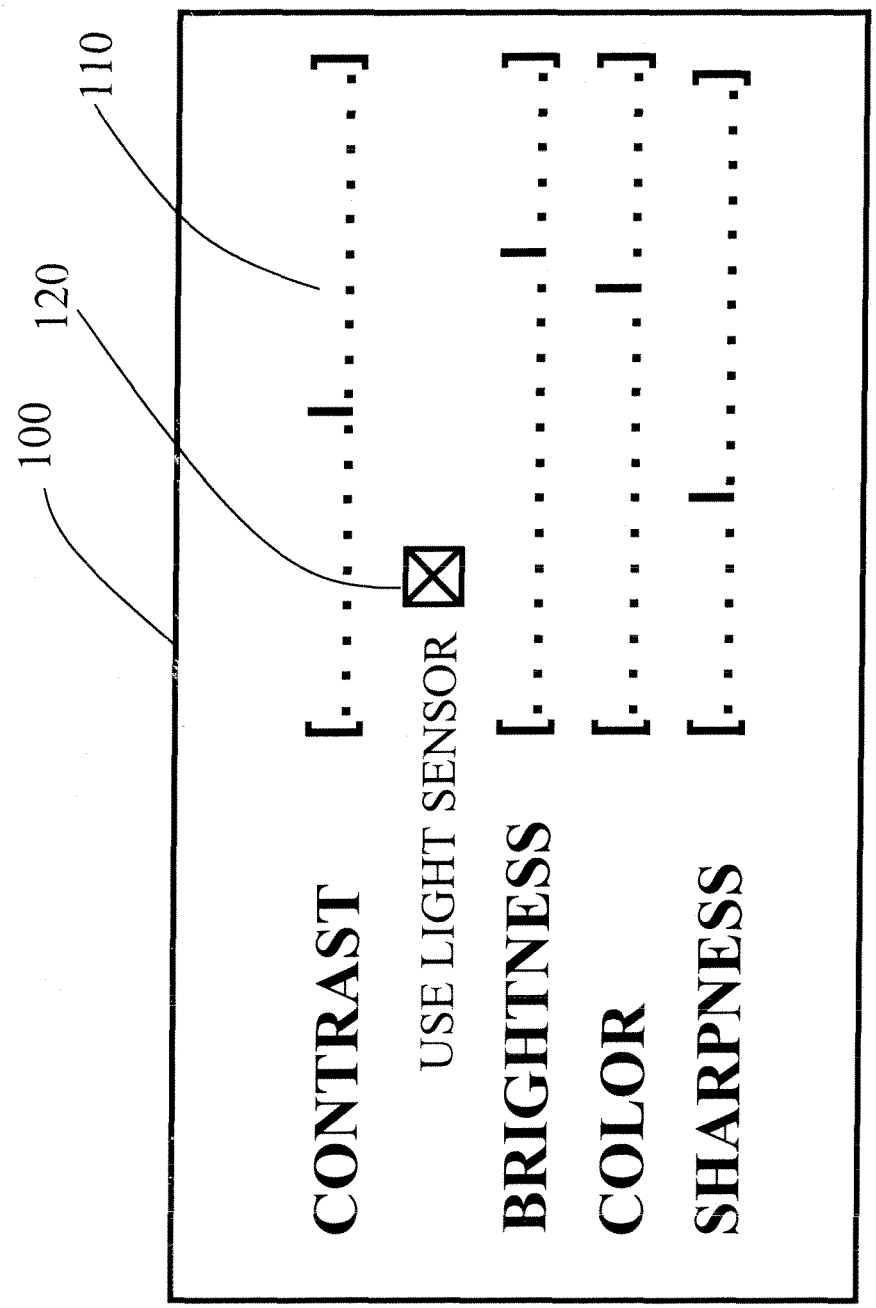
FIG. 3 is a schematic view of an exemplary user interface of a display device according to the present invention.

FIG. 3 is a schematic view of an exemplary user interface of a display device according to the present invention. In FIG. 3, a user interface 100 is provided for displaying different variable features within an image display region for displaying images for a display device. Here, display of the user interface 100 may be provided to the user by a direct selection from either a remote controlling device or from a selection button on the display device. The user interface 100 may include control inputs 110 for selecting image display characteristic values, such as CONTRAST, BRIGHTNESS, COLOR, and SHARPNESS, either individually or in groups, and for the selection 120 of enabling or disabling an automatic LIGHT SENSOR. Enabling the automatic LIGHT SENSOR may disable the user to adjust the control input for image CONTRAST.

Figure 4:
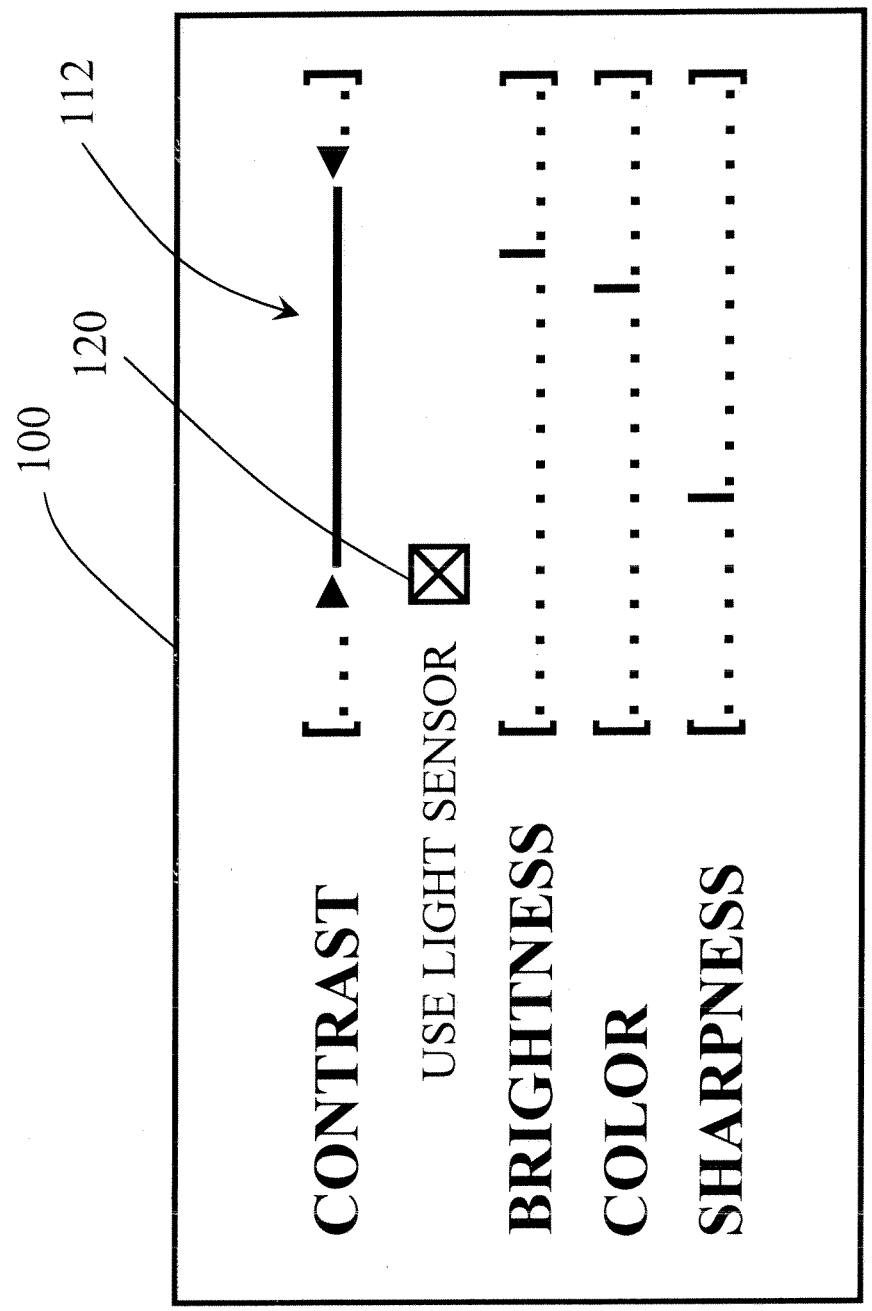
FIG. 4 is a schematic view of another exemplary user interface of a display device according to the present invention.

In addition, the user interface 100 may allow the user to set upper and lower limits of the automatic LIGHT SENSOR according to user preferences. For example, when ambient lighting conditions of the user's home viewing conditions are at a relative maximum, i.e., interior lights are turned ON or during full daylight, or when ambient lighting conditions of the user's home viewing conditions are at a relative minimum, i.e., interior lights are turned OFF, the user may predefine a range 112 with which the automatic LIGHT SENSOR may control image CONTRAST. This predefined range 112 may be performed using another user interface, such as the exemplary user interface of FIG. 4, or by using the exemplary user interface 100, as shown in FIG. 3, with slight modification. However, if the automatic LIGHT SENSOR is disabled, the user may have control for setting the image CONTRAST over an entire range of possible values.

According to the present invention, the default factory setting of the selection 120 for enabling or disabling the automatic LIGHT SENSOR may be in the disabled or OFF condition. Accordingly, by co-locating the control inputs for the image quality, i.e., CONTRAST, and the selection 120 for enabling/disabling the automatic LIGHT SENSOR, the user will associate the automatic LIGHT SENSOR with the image CONTRAST control and conveniently optimize the display device for the home viewing environment.

In liquid crystal display (LCD) devices, values for the image CONTRAST commonly control the intensity of a backlight device disposed behind a liquid crystal display panel. In addition, some LCD devices provide separate controls for the backlight device and the image CONTRAST to adjust the backlight intensity and digital video gain, respectively.

Figure 5:
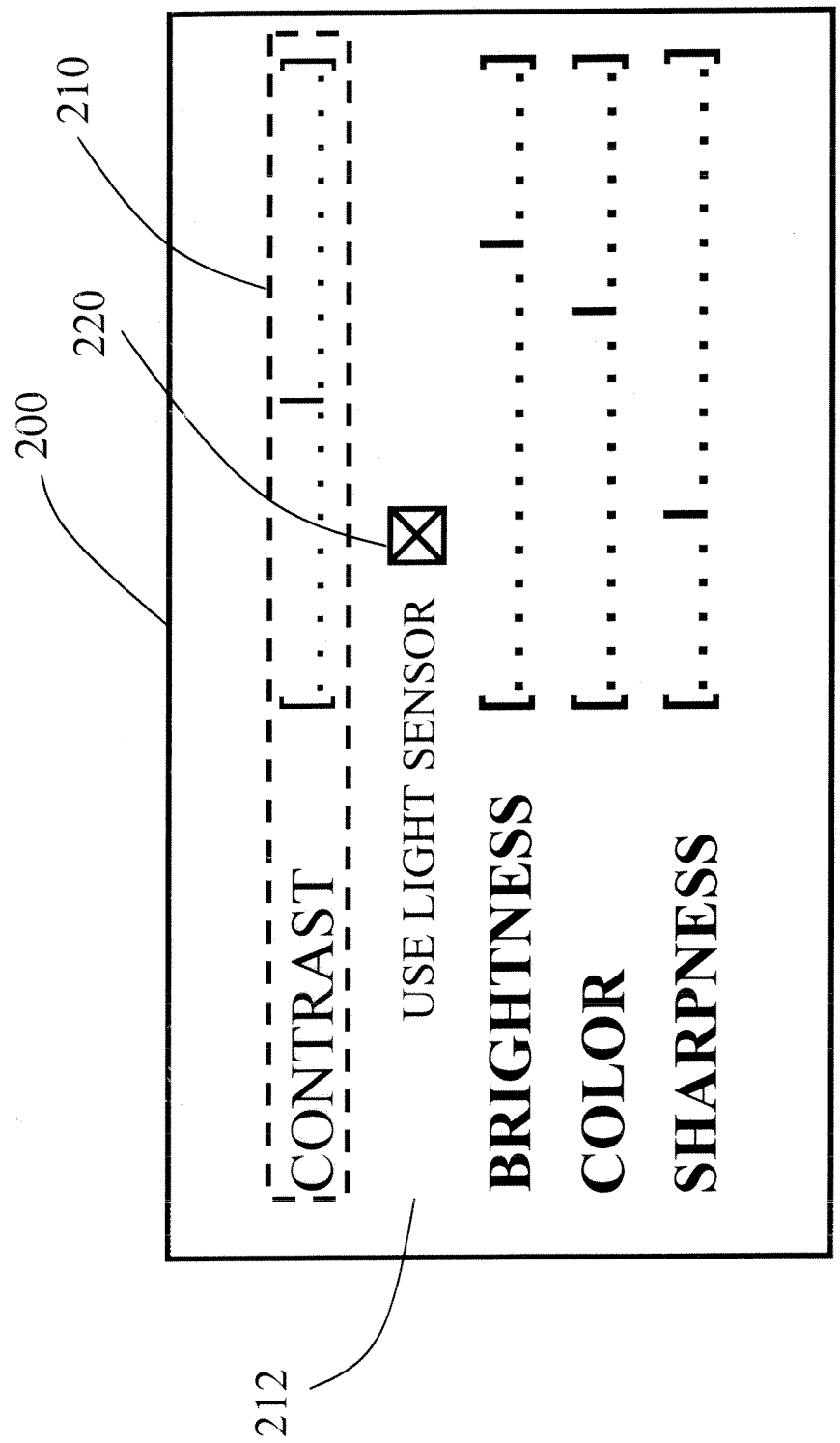
FIG. 5 is a schematic view of another exemplary user interface of a display device according to the present invention.

FIG. 5 is a schematic view of another exemplary user interface of a display device according to the present invention. In FIG. 5, the user interface 200 is provided for displaying different variable features within an image display region for displaying images for a display device. Here, display of the user interface 200 may be provided to the user by a direct selection from either a remote controlling device or from a selection button on the display device. The user interface 200 may include control inputs 210 for selecting image display characteristic values, such as CONTRAST, BRIGHTNESS, COLOR, and SHARPNESS, and for the selection 220 of enabling or disabling an automatic LIGHT SENSOR. Enabling the automatic LIGHT SENSOR may disable the user to adjust the control input for image CONTRAST, and will distinguish the image CONTRAST 212 from the other image display characteristic values, such as a "graying-out" the text word "CONTRAST," reducing the text size of the word "CONTRAST," or changing the text font of the word "CONTRAST."

In FIG. 5, when the automatic LIGHT SENSOR is enabled by selection 220, the control input for the image CONTRAST will continue to function as a light sensor meter to provide the user with an indication as to the relative adjustment to the image CONTRAST based upon ambient lighting conditions sensed by the automatic LIGHT SENSOR. Here, the user interface 200 may function to select increased image CONTRAST under relatively high ambient lighting conditions and reduced image CONTRAST under relatively low ambient lighting conditions.

According to the present invention, the user interface may be provided as an overlay to the displayed images of the display device. Thus, the user may change the values of the image CONTRAST and enable/disable the automatic LIGHT SENSOR to immediately view the displayed images in real time to see the effects of the changed values without having to exit out of the user interface. Alternatively, the user interface according to the present invention may be embedded within set-up menus for the display device. Here, changes to the values of the image CONTRAST and enable/disable the automatic LIGHT SENSOR may not be immediately viewed from the displayed images in real time. Thus, the user must first exit out of the user interface to view the selected changes to the displayed images.

It will be apparent to those skilled in the art that various modifications and variations can be made in the user selectable run-time for display devices and method of reducing power consumption for display devices of the present invention without departing from the spirit or scope of the inventions. Thus, it is intended that the present invention covers the modifications and variations of this invention provided they come within the scope of the appended claims and their equivalents.

What is claimed is:

1. A display device, comprising:
an image display region displaying images;
an automatic light sensor sensing ambient lighting conditions of a location of the display device; and
a control system controlling an amount of light produced within the image display region by the displayed images based upon the sensed ambient lighting conditions,
wherein the control system includes a single user interface displayed within the image display region and allows simultaneous enabling/disabling of the automatic light sensor and adjusting of image display characteristic values of the displayed images by a user,
disabling the automatic light sensor enables the adjusting of an image display characteristic value by the user, and enabling the automatic light sensor disables the adjusting of an image display characteristic value by the user,
the disabled adjustment of an image display characteristic value includes modifying an appearance of a portion of the single user interface corresponding to the image display characteristic value to provide at least one metering display of the image display characteristic value determined by the automatic light sensor, and
the modifying of the appearance includes one of greying-out of text corresponding to the image display characteristic value, reducing size of text corresponding to the image display characteristic value, and changing a font of text corresponding to the image display characteristic value.

2. The device according to claim 1, wherein the image display characteristic values include at least one of image contrast, image brightness, and image backlight.

3. The device according to claim 1, wherein the simultaneous enabling/disabling of the automatic light sensor and the adjusting of the image contrast values includes use of one of a remote control device and a control device integrated with the display device.

4. The device according to claim 1, wherein the enabling of the automatic light sensor includes adjusting upper and lower limits of the image contrast values by the user.

5. The device according to claim 4, wherein the adjusting of the upper and lower limits establishes an operable range of the automatic light sensor for the adjusting of the image contrast values.

6. A method of operating a display device, comprising:
measuring ambient lighting conditions of a location of the display device; and
controlling an amount of light produced by displayed images within an image display region of the display device based upon the measuring of the ambient lighting conditions,
wherein the controlling of produced light includes a control system having a single user interface displayed within the image display region to simultaneously enable/disable the automatic light sensor and adjust image display characteristic values of the displayed images,
the disabled automatic light sensor enables the adjusting of an image display characteristic value, and the enabled automatic light sensor disables the adjusting of an image display characteristic value,
the disabled adjusting of an image display characteristic value includes modifying an appearance of a portion of the single user interface corresponding to the image display characteristic value to provide at least one metering display of the image display characteristic value determined by the automatic light sensor, and
the modifying of the appearance includes one of greying-out of text corresponding to the image display characteristic value, reducing size of text corresponding to the image display characteristic value, and changing a font of text corresponding to the image display characteristic value.

7. The method according to claim 6, wherein the image display characteristic values include at least one of image contrast, image brightness, and image backlight.

8. The method according to claim 6, wherein the simultaneous enabling/disabling of the automatic light sensor and the adjusting of the image display characteristic values includes use of one of a remote control device and a control device integrated with the display device.

9. The method according to claim 6, wherein the enabling of the automatic light sensor includes adjusting upper and lower limits of the image contrast values by the user.

10. The method according to claim 9, wherein the adjusting of the upper and lower limits establishes an operable range of the automatic light sensor for the adjusting of the image contrast values.

11. A programmable user interface system for a display device, comprising:
a user programming screen provided within an image display region of the display device,
wherein the user programming screen provides simultaneous enablement/disablement of an automatic light sensor and adjustment of image display characteristic values of broadcast images within the image display region,
disabling the automatic light sensor enables the adjusting of an image display characteristic value by a user, and enabling the automatic light sensor disables the adjusting of an image display characteristic value by the user,
the disabled adjustment of the image display characteristic value includes modifying an appearance of a portion of the user programming screen corresponding to the image display characteristic value to provide at least one metering display of the image display characteristic value determined by the automatic light sensor, and
the modifying of the appearance includes one of greying-out of text corresponding to the image display characteristic value, reducing size of text corresponding to the image display characteristic value, and changing a font of text corresponding to the image display characteristic value.

12. The system according to claim 11, wherein the user programming screen is provided concurrently with the display of the broadcast images within the image display region.

13. The system according to claim 12, wherein the adjustment of an image display characteristic value of the broadcast images is instantly shown by the broadcast images while the user programming screen is displayed.

14. The system according to claim 12, wherein the simultaneous enablement/disablement of an automatic light sensor and adjustment of an image display characteristic value includes use of one of a remote control device and a control device integrated with the display device.

* * * * *